R. S. HEISE.
PEDAL RUBBER.
APPLICATION FILED APR. 29, 1920.
1,432,392. Patented Oct. 17, 1922.
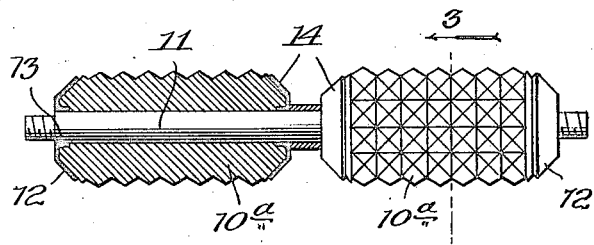
Fig. 1.
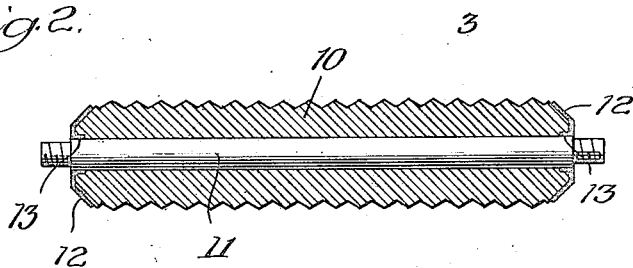
Fig. 2.
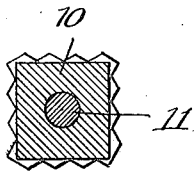
Fig. 3.
Inventor:
Roscoe S. Heise,
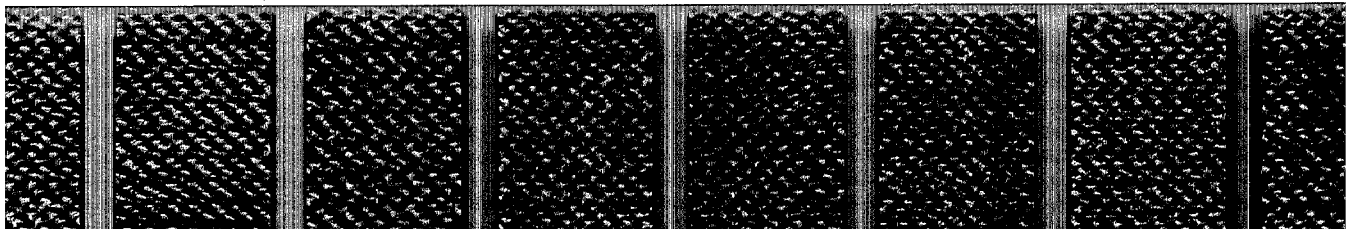

Patented Oct. 17, 1922.

1,432,392

UNITED STATES PATENT OFFICE.

ROSCOE S. HEISE, OF MIDDLETOWN, OHIO, ASSIGNOR TO MIAMI CYCLE & MFG. CO., OF MIDDLETOWN, OHIO, A CORPORATION OF OHIO.

PEDAL RUBBER.

Application filed April 29, 1920. Serial No. 377,450.

*To all whom it may concern:*

Be it known that I, ROSCOE S. HEISE, a citizen of the United States, residing at Middletown, in the county of Butler and State of Ohio, have invented a new and useful Improvement in Pedal Rubbers, of which the following is a specification.

This invention relates to pedal rubbers.

Heretofore, a great deal of trouble has been experienced owing to pedal rubbers wearing out rapidly, splitting longitudinally and dropping off the pedal rods. An examination of a great many pedal rubbers reveals the fact that this wearing and splitting action starts at the ends of the rubbers. The primary object of this invention, therefore, is to provide for remedying this defect by reinforcing the rubbers so as to prolong their life.

Referring to the accompanying drawings:—

Figure 1 is a side elevation partially in section of a pedal rubber embodying this invention. Figure 2 is a longitudinal section of another form of pedal rubber also embodying my invention and Figure 3 is a transverse section on the line 3 of Fig. 1.

In Fig. 2 is shown the invention as used on a pedal rubber 10 having a longitudinal central opening through which is inserted a pedal rod 11. The ends of the pedal rubber are reinforced by means of a thimble or support 12 having a tubular central opening 13 which fits snugly over the pedal rod 11. This plate may have the form of the frustum of a cone or a pyramid as desired and the ends of the pedal rubber are made to conform to the particular thimble employed so that a good uniform seat is obtained between them.

In Fig. 2 is shown a form having two pedal rubbers 10$^a$ mounted on a pedal rod 11, with a thimble 12 at each end of the rod and a double thimble 14 between these rubbers, these thimbles having bearings on the pedal rod.

While I have shown and described but a single embodiment of my invention it is to be understood that it is capable of many more modifications. Changes, therefore, in the construction and arrangement may be made which do not depart from the scope of the appended claim in which it is my intention to claim all novelty inherent in my invention as broadly as possible in view of the prior art.

What I claim as new and desire to secure by Letters Patent is:

The combination of a bicycle pedal rubber having a central opening for the supporting rod thereof with a thimble having a central opening provided with a sleeve projecting inwardly therefrom, said sleeve adapted to surround said rod and project within the opening in said rubber whereby the thimble will be supported by the rod, said thimble presenting its socketed portion toward said rubber and entirely surrounding the end thereof.

ROSCOE S. HEISE.